(12) United States Patent
Cheng et al.

(10) Patent No.: US 7,109,446 B1
(45) Date of Patent: Sep. 19, 2006

(54) METHOD AND APPARATUS FOR IMPROVING STEAM TEMPERATURE CONTROL

(75) Inventors: Xu Cheng, Pittsburgh, PA (US); Richard W. Kephart, Kittanning, PA (US)

(73) Assignee: Emerson Process Management Power & Water Solutions, Inc., Pittsburgh, PA (US)

(*) Notice: Subject to any disclaimer, the term of this patent is extended or adjusted under 35 U.S.C. 154(b) by 0 days.

(21) Appl. No.: 11/057,657

(22) Filed: Feb. 14, 2005

(51) Int. Cl.
*H05B 1/02* (2006.01)

(52) U.S. Cl. ............ 219/497; 219/494; 122/379; 431/3

(58) Field of Classification Search ........ 219/494, 219/499, 497, 501, 506, 508, 483–486; 122/379, 122/404, 40, 7 R; 431/3, 10, 8; 110/344–348
See application file for complete search history.

(56) References Cited

U.S. PATENT DOCUMENTS 2,948,013 A * 8/1960 Bearer, Jr. ............ 15/318.1
4,454,840 A * 6/1984 Dziubakowski ............ 122/390
4,615,302 A * 10/1986 Wynnyckyj et al. ........ 122/379
4,996,951 A * 3/1991 Archer et al. ............ 122/379
5,615,953 A * 4/1997 Moskal ............ 374/7
6,758,168 B1 7/2004 Koskinen et al.

* cited by examiner

*Primary Examiner*—Mark Paschall
(74) *Attorney, Agent, or Firm*—Marshall, Gerstein & Borun LLP

(57) ABSTRACT

A system for analyzing the impact of operating soot blowers in a heat transfer section of a power plant determines a steam temperature influencing sequence and calculates a feed-forward signal to be applied to a steam temperature control system of the heat transfer section. The system operates a group of soot blowers for a number of times and collects quantitative data related to the steam temperature during and after each soot blowing operation. A computer program used by the system analyzes the quantitative data, generates a number of statistical parameters for evaluating the impact of operating the soot blowers according to a given sequence on the steam temperature, and determines whether the given sequence is a steam temperature influencing sequence. Consequently, the system determines a feed-forward signal based on the steam temperature influencing sequence and applies the feed-forward signal to a steam temperature control system used by the heat transfer section to compensate for any adverse impact of soot blowing.

20 Claims, 7 Drawing Sheets

METHOD AND APPARATUS FOR IMPROVING STEAM TEMPERATURE CONTROL

TECHNICAL FIELD

This patent relates generally to computer software, and more particularly to computer software used in electric power generation systems.

BACKGROUND

Electric power plants generate electricity using various types of power generators, which may be categorized, depending on the energy used to generate electricity, into thermal, nuclear, wind, hydroelectric, etc., generators. Each of these various types of generators operates under different sets of constraints. For example, an output of a thermal generator is a function of the amount of heat generated in a boiler, wherein the amount of heat is determined by the amount of fuel that can be burned per hour, etc. Additionally, the output of the thermal generator may also be dependent upon the heat transfer efficiency of the boiler used to burn the fuel. Similar types of constraints exist with other types of electric power plants. Moreover, for most power plants using boilers, the desired steam temperature set-points at final superheater and reheater outlets are constant and it is necessary to maintain steam temperature close to the set-points within a narrow range at all load levels.

Fuel burning electric power generators operate by burning fuel to generate steam from water traveling through a number of pipes and tubes in the boiler. The steam is used to generate electricity in one or more turbines. However, burning of certain types of fuel, such as coal, oil, waste material, etc., also generates a substantial amount of soot, slag, ash and other deposits ("soot") on various surfaces in the boilers, including the inner walls of the boiler as well as on the exterior walls of the tubes carrying the water through the boiler. The soot deposited in the boiler has various deleterious effects on the rate of heat transfer from the boiler to the water and thus on the efficiency of power generators using the boilers. Therefore, it is necessary to address the problem of soot in fuel burning power plants that burn coal, oil, and other such fuels that generate soot. It should be noted that while not all fuel burning power plants generate soot, for the remainder of this patent the term "fuel burning power plants" is used to refer to those power plants that generate soot.

Various solutions are used to address the problems caused by generation and presence of soot deposits in boilers of fuel burning power plants. For example, fuel burning power plants use soot removing devices or equipment known as soot blowers as part of operating boilers. Fuel burning power plants use various types of soot blowers to spray cleaning materials through nozzles, which are located on the gas side of the boiler walls and/or on other heat exchange surfaces. Such soot blowers use any of the various media such as saturated steam, superheated steam, compressed air, water, etc., for removing soot from the boilers.

However, soot blowing activity affects many aspects of boiler operations. For example, soot blowing affects heat transfer efficiency, steam temperature control, levels of $NO_X$ inside the boilers, etc. For example, soot blowing in a water wall section of a boiler increases heat absorption rate in the water wall section, which reduces the temperature of the flue gas leaving the furnace section of the boiler. As a result, the flue gases entering the convection section may have a lower temperature, resulting in lower heat absorption in a superheat section and a reheat section of the boiler, and therefore, reducing the steam temperature in these sections as well. On the other hand, soot blowing in the convection section of a boiler increases the heat absorption rate, resulting in increased steam temperature.

Various qualitative effects of soot blowing are well known. However, it is difficult to determine precise quantitative impact of soot blowing on the efficiency and steam temperature of fuel burning power plants. Compensation techniques used by existing control systems include using a feedback PID controller that modulates at least one of spray flow levels, burner tilts, and flue gas bypass dampers, to compensate for the effect of soot blowing. However, often such feedback compensation action is reactionary and it may cause significant steam temperature swings. Therefore, it is necessary to develop a systematic method of constructing a feed-forward signal to compensate for the impacts of soot blowing.

In today's competitive electrical utility industry where utilities use various sophisticated control systems to manage operating costs and increase efficiency of power generators, it is important to understand the effects of operating soot blowers so that operators and control systems may make informed decisions about how to compensate for the disturbances caused by soot blowing. Thus, there is a need to provide better quantitative information about the impact of soot blowing so that any adverse or negative impact of soot blowing can be compensated for more effectively.

BRIEF DESCRIPTION OF THE DRAWINGS

The present patent is illustrated by way of examples and not limitations in the accompanying figures, in which like references indicate similar elements, and in which.

DETAILED DESCRIPTION OF THE EXAMPLES

A system for analyzing the impact of operating soot blowers in a heat transfer section of a power plant determines a steam temperature influencing sequence and calculates a feed-forward signal to be applied to a steam temperature control system of the heat transfer section. The system operates a group of soot blowers a number of times and collects quantitative data related to the steam temperature during and after each soot blowing operation. A computer program used by the system analyzes the quantitative data, generates a number of statistical parameters for evaluating the impact of operating the soot blowers according to a given sequence on the steam temperature, and determines whether the given sequence is a steam temperature influencing sequence. Consequently, the system determines a feed-forward signal based on the steam temperature influencing sequence and applies the feed-forward signal to a steam temperature control system used by the heat transfer section to compensate for any adverse impact of soot blowing. Following figures describe an implementation of this system in a coal or oil burning power plant.

Figure 1:
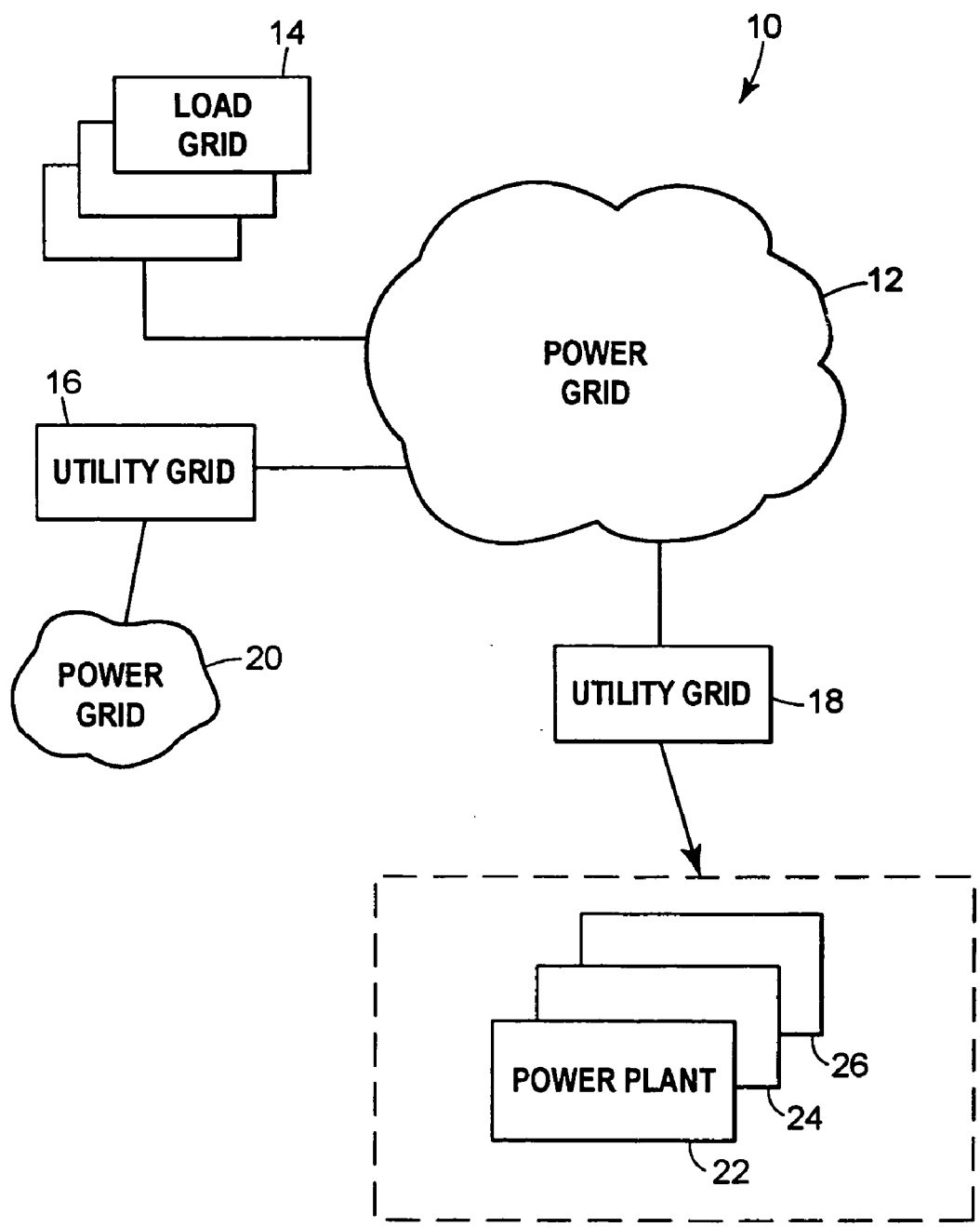
FIG. 1 illustrates a block diagram of a power distribution system.

FIG. 1 illustrates a power distribution system 10, including a power grid 12 that may be connected to a load grid 14 and one or more utility grids 16, 18. The utility grid 16 is connected to a second power grid 20, and the utility grid 18 is illustrated as being formed of one or more power plants 22–26, which may include any of the various types of power plants such as nuclear power plants, hydroelectric power plants, thermal power plants, etc. Additionally, each of the power plants 22–26 may include any number of individual power generators.

Operation of the utility grid 18 and the power plants 22–26 can be highly complex. As a result, to maintain the utility grid 18 running smoothly, it is necessary that each of the power plants 22–26 is managed with very high precision and in a highly predictable manner. To ensure that each of the power plants 22–26 can efficiently meet the power load required from them most efficiently, the power plants 22–26 use various control systems to ensure efficient operation throughout various sections of each of the power plants 22–26.

For example, fuel burning power plants that use coal, oil, gas or other fuels to produce electricity use control systems to ensure the quality and quantity of the fuel injected into the furnaces, to ensure that the steam flow through various boilers is at optimum levels, etc. Typically, fuel burning power plants have one or more boilers where superheated steam is created by passing water through a series of tubes located inside the boiler. The superheated steam then enters a steam turbine where it powers the turbine and a generator connected to the turbine to produce electricity.

As noted above, soot, ash and other deposits that settle on the walls of the water carrying tubes result in reduction of heat transferred from the burning of fuel to the water and steam traveling through the tubes. To ensure that maximum heat is transferred to the water and steam passing through the boiler tubes, boiler walls and tubes are provided with soot blowers that routinely blow soot deposited on the tubes.

Figure 2:
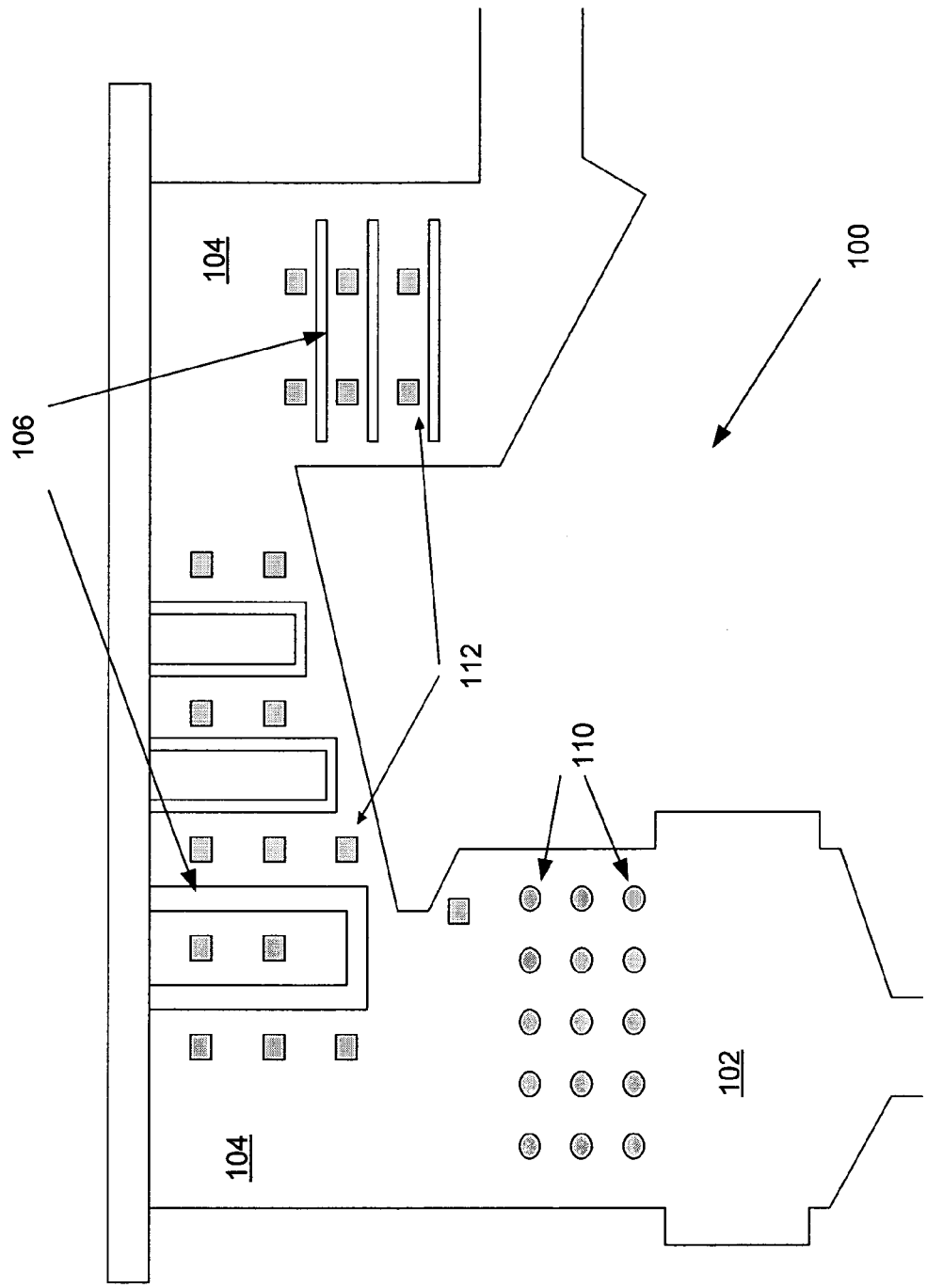
FIG. 2 illustrates a block diagram of a boiler used in a fuel burning power plant.

FIG. 2 illustrates a cross sectional view of a typical boiler 100 and its associated soot blower system. The boiler 100 is used to generate saturated (or superheated for once-through boiler) steam in the furnace section 102 and superheated steam in a convection section 104. The convection section 104 may include a superheat section and a reheat section. The boiler 100 includes a number of superheating and reheating tubes 106 located in the convection section 104, where these tubes 106 are used to carry water and superheated steam. The boiler 100 is shown to have a number of fixed soot blowers 110 and a number of retractable soot blowers 112.

Figure 3:
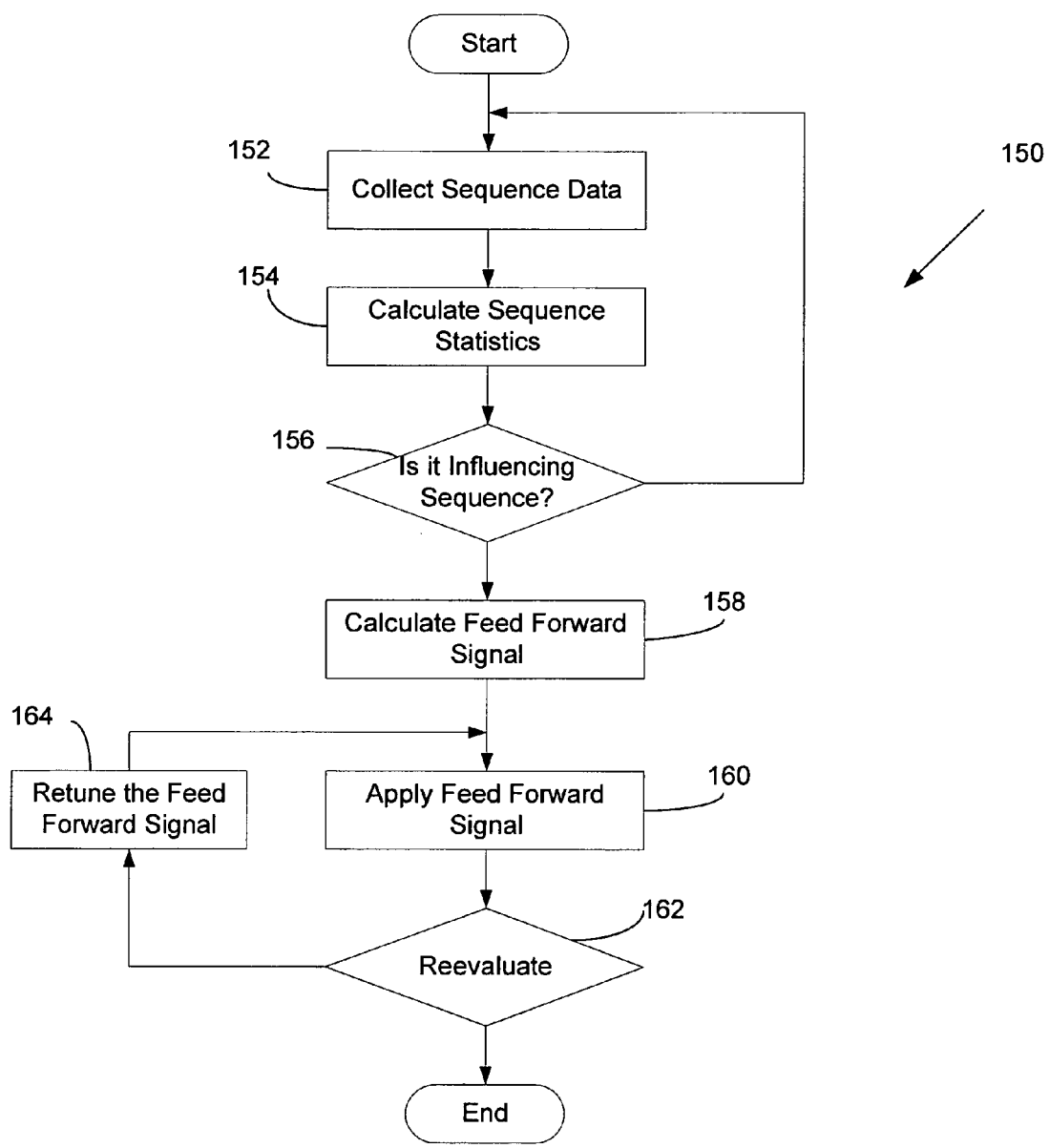
FIG. 3 illustrates a flowchart of a soot blowing analysis program used by the boiler of FIG. 2.

As discussed above, soot blowing affects many aspects of boiler operation. Thus, for ensuring efficient operation of the boiler 100 it is necessary to analyze the impact of soot blowing. FIG. 3 illustrates a flowchart of a soot blowing analysis program 150 used for analyzing the impact of soot blowing on the operation of the boiler 100 by measuring its impact on the steam temperature of the superheated steam and/or the reheat steam. The analysis program 150 may be implemented as software, firmware, hardware or any combination thereof.

Specifically, the analysis program 150 operates the soot blowers of a given section of the boiler 100 a plurality of times, each operation of the soot blowers following a pre-determined pattern. During each of these operations, the analysis program 150 collects data related to various characteristics of the spray used by the soot blowers in the given section, such as the spray flow, etc., and its impact on steam temperature of the given section. After collecting the data, the analysis program 150 evaluates one or more statistical qualities of the collected data to determine a steam temperature influencing sequence, and using the steam temperature influencing sequence, the analysis program 150 determines a feed-forward signal to be used by a steam temperature control system used by the boiler 100.

Now turning to the detailed operation of the analysis program 150, a block 152 operates the soot blowers 110 and 112 based on a number of pre-determined soot blowing sequences. Because some of the boilers may already run soot blowers according to pre-established soot blowing procedures, it may be necessary to modify such procedures. Alternatively, the block 152 may select one or more soot blowing sequences currently used by the boiler and collect data related to these sequences. The block 152 may collect data using sequences that are specific to one or more sections of the boiler 100, specific to one ore more types of soot blowers 110–112, etc. Thus, for example, the block 152 may use different sequences for collecting data related to soot blowers located in the furnace section 102 compared to the sequences used for collecting data related to the soot blowers located in the convection section 104. Alternatively, the block 152 may collect data using different sequences for fixed soot blowers compared to the sequences used for retractable soot blowers.

Each of the various sequences used by the analysis program 150, whether directed to a particular section of the boiler 100 or directed to a particular type of soot blowers, provides for operating a series of soot blowers in a specified manner. An exemplary implementation of applying soot blower sequences in a reheat section of the convection section 104 is illustrated in FIG. 4.

Figure 4:
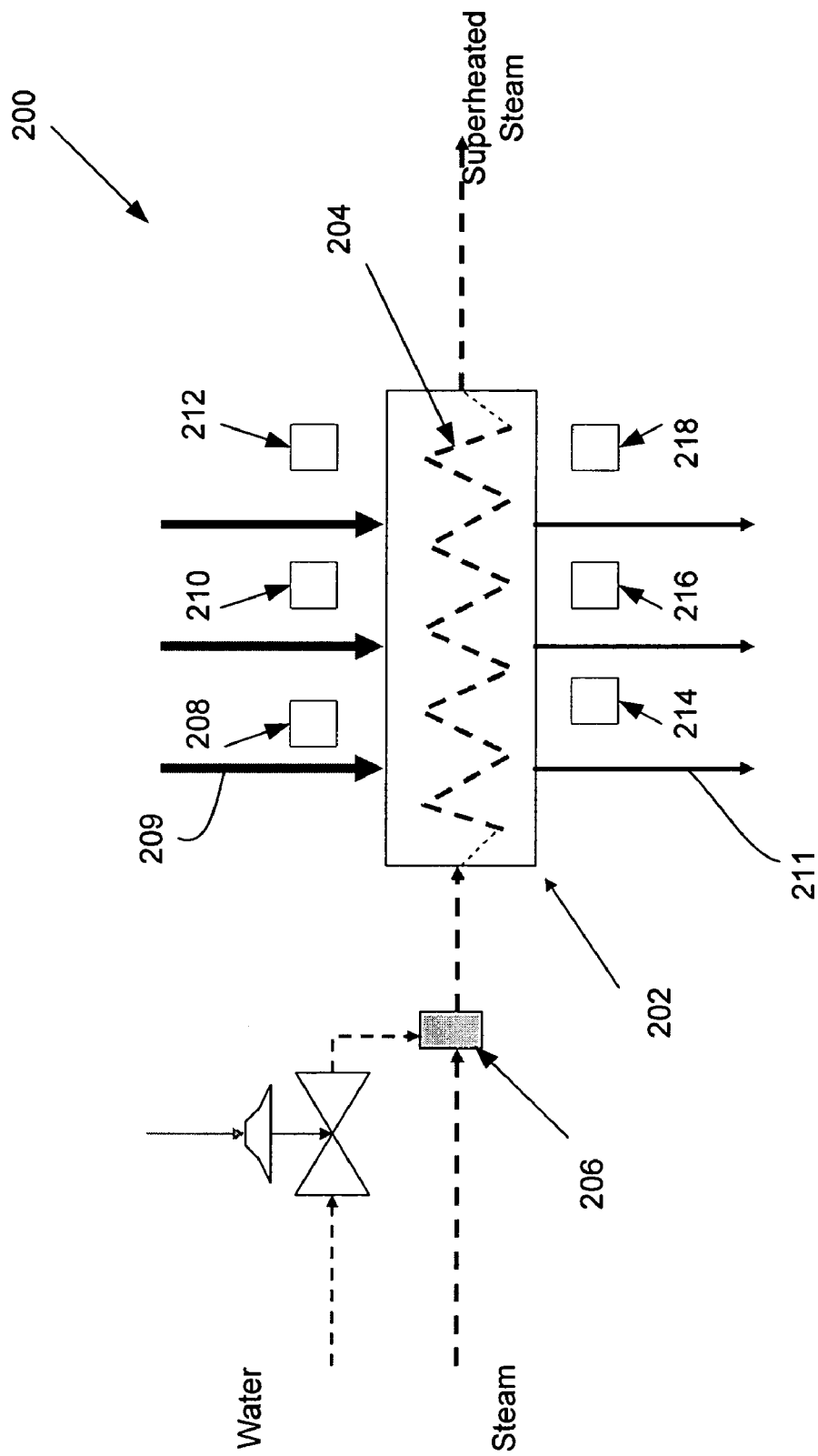
FIG. 4 illustrates a block diagram of a reheat (or superheat) section of the boiler of FIG. 2.

Specifically, FIG. 4 is a schematic diagram of a reheat section 200 having a heat exchanger 202 located in the path of flue gas from the boiler 100. The reheat section 200 may be part of the convection section 104 of FIG. 2. The heat exchanger 202 includes a number of tubes 204 for carrying steam which is mixed together with spray water in a mixer 206. The heat exchanger 202 converts the mixture of the water and steam to superheated steam. The flue gases input to the reheat section 200 are shown schematically by the arrows 209 and the flue gases leaving the reheat section 200 are shown schematically by the arrows 211. The reheat section 200 is shown to include six soot blowers 208, 210, 212, 214, 216 and 218, for blowing a spray mixture to remove soot from the external surface of the heat exchanger 202. The soot blowers 208–218 may be operated according to a particular soot blowing sequence, which specifies the order in which each of the soot blowers 208–218 is to be turned on. Once the soot blowers 208–218 are operated according to that particular sequence, the block 152 collects data regarding the temperature of steam in the reheat section 200.

Figure 5:
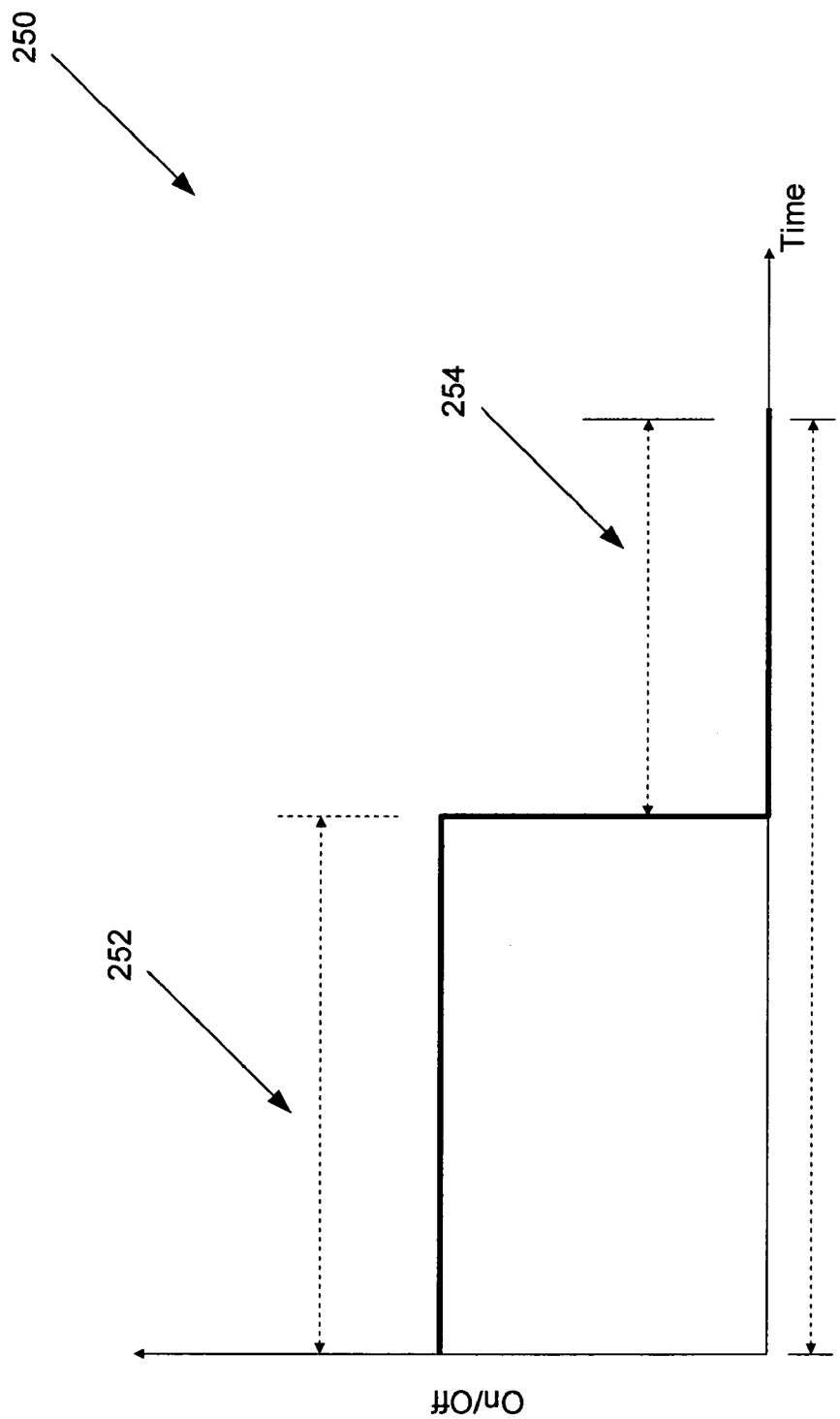
FIG. 5 illustrates a graph showing an operation of the soot blowers of FIG. 4.

The block 152 collects data related to operation of the soot blowers 208–218 and its impact on various characteristics of steam by operating the soot blowers 208–218 for an on time period and then turning off the soot blower 208–218 for an off time period. This is further illustrated in FIG. 5 by a graph 250, where during the on time period 252, the soot blowers 208–218 are operated according to a pre-determined soot blowing sequence and during an off time period 254, the soot blowers 208–218 are turned off.

The block 152 generally collects data representing the effect of soot blowing during the soot blowing period 252 and at the beginning of the off time period 254. The number of times each of the various pre-determined sequences needs to be run before the collected data can be analyzed may be determined by the operator of the boiler 100. However, typically, the pre-determined sequences need to be run for approximately thirty times to get statistically significant information about the impact of the soot blowing sequences on the steam temperature.

Subsequently, a block 154 calculates various statistical parameters from the data collected by the block 152. Thus, to determine whether an $i^{th}$ sequence, which is made of operating the soot blowers 208–218, is a steam temperature influencing sequence or not, the block 154 calculates various statistical parameters related to the data collected for the $i^{th}$ sequence. Suppose that the $i^{th}$ sequence is run a number of times, with each run of a time length defined as a soot blowing influencing time ($SIT_i$), and each run identified by an index j (j=1 to N). Whether the $i^{th}$ sequence is actually a steam temperature influencing sequence or not will be determined based on evaluation of various statistical parameters as specified below using equations (1) through (7):

$$STV_{pos,i,j} = T_{max,i,j} - T_{0,i,j} \tag{1}$$

$$STV_{neg,i,j} = T_{min,i,j} - T_{0,i,j} \tag{2}$$

Where $STV_{pos,i,j}$ is the positive steam temperature variance when the $i^{th}$ sequence runs at the $j^{th}$ time, $STV_{neg,i,j}$ is the negative steam temperature variance when the $i^{th}$ sequence runs at the $j^{th}$ time, $T_{0,i,j}$ is the initial steam temperature when the $i^{th}$ sequence starts the $j^{th}$ time, $T_{max,i,j}$ is the maximum steam temperature when the $i^{th}$ sequence runs at the $j^{th}$ time, and $T_{min,i,j}$ is the minimum steam temperature when the $i^{th}$ sequence runs at the $j^{th}$ time.

$$STV_{avg,i,j} = \frac{1}{M} \sum_{k=1}^{M} (T_{k,i,j} - T_{0,i,j}) \tag{3}$$

Where $STV_{avg,i,j}$ is the average steam temperature when the $i^{th}$ sequence runs at the $j^{th}$ time and for the time period $SIT_i$, M is the number of sampling points during the time period $SIT_i$, and $T_{k,i,j}$ is the steam temperature measurement when the $i^{th}$ sequence runs at the $j^{th}$ time and at a sampling time k.

$$SFV_{pos,i,j} = F_{max,i,j} - F_{0,i,j} \tag{4}$$

$$SFV_{neg,i,j} = F_{min,i,j} - F_{0,i,j} \tag{5}$$

Where $SFV_{pos,i,j}$ is the positive spray flow variance when the $i^{th}$ sequence runs at the $j^{th}$ time, $SFV_{neg,i,j}$ is the negative spray flow variance when the $i^{th}$ sequence runs at the $j^{th}$ time, $F_{0,i,j}$ is the initial spray flow when the $i^{th}$ sequence runs at the $j^{th}$ time, $F_{max,i,j}$ is the maximum spray flow when the $i^{th}$ sequence runs at the $j^{th}$ time, and $F_{min,i,j}$ is the minimum spray flow when the $i^{th}$ sequence runs at the $j^{th}$ time.

$$SFV_{avg,i,j} = \frac{1}{M} \sum_{k=1}^{M} (F_{k,i,j} - F_{0,i,j}) \tag{6}$$

Where $SF_{avg,i,j}$ as the average spray flow when the $i^{th}$ sequence runs at the $j^{th}$ time, for the time period $SIT_i$, M is the total sampling points during the time period $SIT_i$, and $F_{k,i,j}$ is the spray flow measurement when the $i^{th}$ sequence runs at the $j^{th}$ time and at the sampling time k.

$$SFO_{i,j} = F_{e,i,j} - F_{0,i,j} \tag{7}$$

Where $SFO_{i,j}$ is the spray flow offset, $F_{e,i,j}$ is the spray flow after a waiting time following the $i^{th}$ sequence at the $j^{th}$ time, and $F_{0,i,j}$ is as defined earlier.

Subsequently, using the values obtained for various statistical parameters as per the equations (1) to (7), the block 154 calculates various mean values and standard deviation values for the $i^{th}$ sequence, where the equations for these mean values are provided in the table 1 below:

TABLE 1

| Mean Value | Equation |
| --- | --- |
| Mean value for the $STV_{pos,i,j}$ for the $i^{th}$ sequence | $\mu_{STV,pos,i} = \frac{1}{N} \sum_{j=1}^{N} STV_{pos,i,j}$ |
| Mean value for the $STV_{neg,i,j}$ for the $i^{th}$ sequence | $\mu_{STV,neg,i} = \frac{1}{N} \sum_{j=1}^{N} STV_{neg,i,j}$ |
| Mean value for the $STV_{avg,i,j}$ for the $i^{th}$ sequence | $\mu_{STV,avg,i} = \frac{1}{N} \sum_{j=1}^{N} STV_{avg,i,j}$ |
| Mean value for the $SFV_{pos,i,j}$ for the $i^{th}$ sequence | $\mu_{SFV,pos,i} = \frac{1}{N} \sum_{j=1}^{N} SFV_{pos,i,j}$ |
| Mean value for the $SFV_{neg,i,j}$ for the $i^{th}$ sequence | $\mu_{SFV,neg,i} = \frac{1}{N} \sum_{j=1}^{N} SFV_{neg,i,j}$ |
| Mean value for the $SFV_{avg,i,j}$ for the $i^{th}$ sequence | $\mu_{SFV,avg,i} = \frac{1}{N} \sum_{j=1}^{N} SFV_{avg,i,j}$ |
| Mean value for the $SFO_{i,j}$ for the $i^{th}$ sequence | $\mu_{SFO,i} = \frac{1}{N} \sum_{j=1}^{N} SFO_{i,j}$ |

The standard deviations are calculated by equations in the following table II below.

TABLE II

| Standard Deviations | Equation |
| --- | --- |
| Standard deviation for the $STV_{pos,i}$ for the $i^{th}$ sequence | $s_{STV,pos,i} = \sqrt{\frac{1}{N-1} \sum_{j=1}^{N} (STV_{pos,i,j} - \mu_{STV,pos,i})^2}$ |
| Standard deviation for the $STV_{neg,i}$ for the $i^{th}$ sequence | $s_{STV,neg,i} = \sqrt{\frac{1}{N-1} \sum_{j=1}^{N} (STV_{neg,i,j} - \mu_{STV,neg,i})^2}$ |

TABLE II-continued

| Standard Deviations | Equation |
|---|---|
| Standard deviation for the $ST_{avg,i}$ for the $i^{th}$ sequence | $s_{STV,avg,i} = \sqrt{\dfrac{1}{N-1} \sum\limits_{j=1}^{N} (STV_{avg,i,j} - \mu_{STV,avg,i})^2}$ |
| Standard deviation for the $SFV_{pos,i}$ for the $i^{th}$ sequence | $s_{SFV,pos,i} = \sqrt{\dfrac{1}{N-1} \sum\limits_{j=1}^{N} (SFV_{pos,i,j} - \mu_{SFV,pos,i})^2}$ |
| Standard deviation for the $SFV_{neg,i}$ for the $i^{th}$ sequence | $s_{SFV,neg,i} = \sqrt{\dfrac{1}{N-1} \sum\limits_{j=1}^{N} (SFV_{neg,i,j} - \mu_{SFV,neg,i})^2}$ |
| Standard deviation for the $SF_{avg,i}$ for the $i^{th}$ sequence | $s_{SFV,avg,i} = \sqrt{\dfrac{1}{N-1} \sum\limits_{j=1}^{N} (SFV_{avg,i,j} - \mu_{SFV,avg,i})^2}$ |
| Standard deviation for the $SFO_i$ for the $i^{th}$ sequence | $s_{SFO,i} = \sqrt{\dfrac{1}{N-1} \sum\limits_{j=1}^{N} (SFO_{i,j} - \mu_{SFO,i})^2}$ |

Once the block 154 has calculated the various mean values and the various variance values for the $i^{th}$ sequence, a block 156 determines whether the $i^{th}$ sequence is a steam temperature influencing sequence or not. The functioning of the block 156 is described in further detail below in FIG. 7. If it is determined that the $i^{th}$ sequence is not a steam temperature influencing sequence, the block 156 transfers control back to the block 152, and the analysis program 150 starts analyzing another sequence.

If it is determined that the $i^{th}$ sequence is a steam temperature influencing sequence, a block 158 calculates a feed-forward signal to be applied to a steam temperature control system used by the boiler 100. In an implementation of the analysis program 150, the feed-forward signal is applied to spray valves used by the boiler 100. The average total amount of spray flow to be utilized to compensate for the impact of the $i^{th}$ sequence on the steam temperature is determined as given by the equation 8 below:

$$E_i = \frac{1}{N} \sum_{j=1}^{N} \left\{ \sum_{k=1}^{M} ((F_{0,i,j} - F_{k,i,j}) \cdot \Delta t) \right\} \quad (8)$$

where, $E_i$ is the average total amount of spray change for a run of the $i^{th}$ sequence, $F_{0,i,j}$ and $F_{k,i,j}$ are as defined before, and $\Delta t$ is the length of the sampling time interval.

Once the block 158 determines the value of $E_i$, a block 160 determines the shape of the feed-forward signal in a manner so that the total spray applied by the feed-forward signal is equal to $E_i$. Thus, when the feed-forward signal is plotted against time, the area covered by the feed-forward signal has an absolute value equal to $E_i$. As one of ordinary skill in the art would appreciate the feed-forward signal may take a number of different shapes, such as triangular, exponential, etc, while still having the area covered by the feed-forward signal to be of an absolute value equal to $E_i$.

Figure 6:
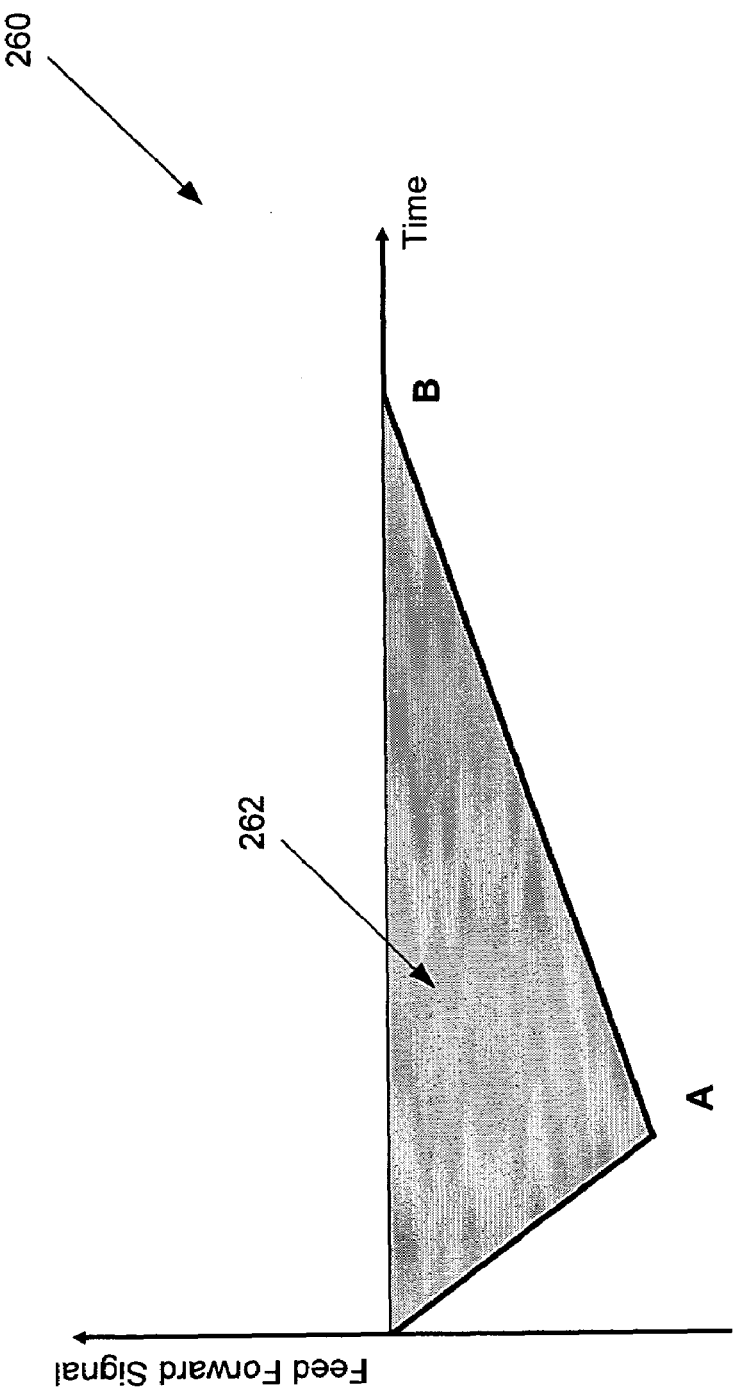
FIG. 6 illustrates a time diagram of a feed-forward signal to be applied to spray controls used by the boiler of FIG. 4.

An example of a triangular feed-forward signal is illustrated by a graph 260 in FIG. 6, in which the shaded area 262 covered by the graph 260 is equal to $E_i$. The operator of the boiler can set the location of the point A at any point through the length of the graph 260 as long as the absolute value of the area 262 covered by the curve is equal to $E_i$. Furthermore, the feed-forward signal may also be added to any existing feed-forward control signal that may be already used by the control system of the boiler 100, where such existing feed-forward control signal may be calculated by some other program within a control system used by the boiler 100.

Whether the feed-forward signal is positive or negative is determined based on the values of the mean average spray flow variance $\mu_{SFV,avg,i}$ and the mean spray flow offset $\mu_{SFO,i}$. Specifically, if values of both the mean average spray flow variance $\mu_{SFV,avg,i}$ and the mean spray flow offset $\mu_{SFO,i}$ are negative, than the feed-forward signal is to be negative, as shown in FIG. 6. On the other hand, if values of both the mean average spray flow variance $\mu_{SFV,avg,i}$ and the mean spray flow offset $\mu_{SFO,i}$ are positive, than the feed-forward signal is to be positive.

Referring back to FIG. 3, once the block 160 determines the shape and area of the feed-forward signal to be used in a particular section of the boiler 100, the block 160 also applies the feed-forward signal to the control system of that particular section. The block 160 may apply the feed-forward signal to control system of that particular section for an extended period of time, say for a month or so, and keep collecting data regarding the steam temperature through that particular section of the boiler.

A block 162 periodically determines whether the goal of implementing the analysis program 150 is achieved or not based on one or more predetermined criteria. One criterion used by the block 162 to determine whether the goal of the analysis program 150 is achieved or not is: (1) the distribution of various statistical parameters used by the analysis program 150 still being close to normal, and (2) (a) if $\mu_{STV,avg,i} < 0$, the absolute value of the $\mu_{STV,neg,i}$ being significantly smaller than the previous absolute value of $\mu_{STV,neg,i}$ or (b) if $\mu_{STV,avg,i} > 0$, the absolute value of $\mu_{STV,pos,i}$ being significantly smaller than the previous value of $\mu_{STV,pos,i}$.

As one of ordinary skill in the art would appreciate, the block 162 evaluates the condition (2)(a) to determine that when the mean value of the $STV_{avg,i,j}$ is negative, the value of $\mu_{STV,neg,i}$ is smaller than before implementation of the analysis program 150, meaning that the size of the negative variance has been reduced. On the other hand the block 162 evaluates the condition (2)(b) to determine that when the mean value of the $STV_{avg,i,j}$ is positive, the value of $\mu_{STV,pos,i}$ is smaller than before implementation of the analysis program 150, meaning that the size of the positive variance has been reduced.

If the block 162, determines that the goal of implementing the analysis program 150 is achieved, the analysis program 150 continues to use the feed-forward signal in its present form next time when the present soot blowing sequence is run. Otherwise, a block 164 retunes the feed-forward signal and the retuned signal is applied during the next run of the present soot blowing sequence.

Figure 7:
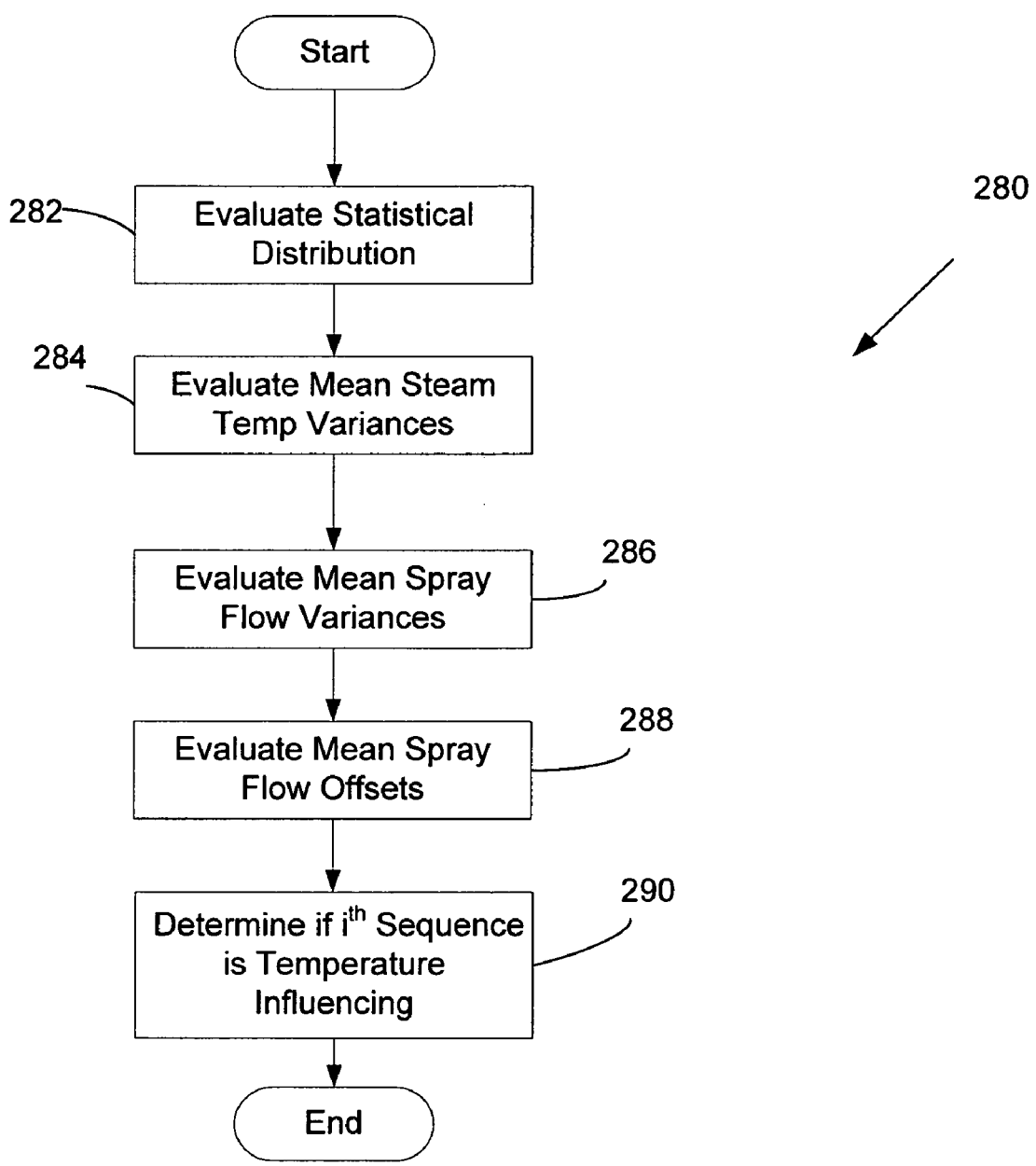
FIG. 7 illustrates a flow chart of an evaluation program for determining whether a soot blowing sequence is a steam temperature influencing sequence or not.

Now referring to FIG. 7, it illustrates a statistical evaluation program 280 that may be implemented by the block 156 to determine whether the $i^{th}$ sequence is in fact a steam temperature influencing sequence or not. A number of different criteria, each criterion evaluating one or more of the various statistical parameters of the $i^{th}$ sequence developed above, may be applied to determine whether the $i^{th}$ sequence is a steam temperature influencing sequence or not. Moreover, when applying any of these criteria, the threshold levels against which the statistical parameters are compared depends on the degree of confidence required in concluding whether the $i^{th}$ sequence is a steam temperature influencing sequence or not. Thus, not all of the various criteria used by the evaluation program 280 are always necessary to determine a steam temperature influencing sequence.

First of all, a block 282 evaluates the statistical distribution of each of the statistical parameters $STV_{pos,i,j}$, $STV_{neg,i,j}$, $STV_{avg,i,j}$, $SFV_{pos,i,j}$, $SFV_{neg,i,j}$, $SFV_{avg,i,j}$ and $SFO_{i,j}$ (for j=1, 2, . . . , N). Specifically, the block 282 determines whether, for the $i^{th}$ sequence, the distributions of these statistical parameters are approximately normal or not. The block 282 may allow a user of the evaluation program 280 to determine what deviation from normal distribution is allowed for these statistical parameters. In an alternate implementation, the block 282 may only require that a weighted combination of all of these parameters is within a pre-determined deviation range. Other criteria to evaluate the normality of the distribution of the statistical parameters may also be used. In addition to the normality test, the standard deviations of these normally distributed data have to be within certain ranges which may be provided by plant operators/engineers.

Subsequently, a block 284 evaluates whether $\mu_{STV,pos,i}$ and $\mu_{STV,neg,i}$ are greater (lesser) than their specified limits when $\mu_{STV,avg,i}$ is positive (negative). The specified limits (i.e., the specified negative steam temperature variance and the specified positive steam temperature variance) can be provided by the user of the analysis program 150, such as a plant operator, a control system operator, etc.

A block 286 evaluates whether $\mu_{SFV,pos,i}$ and $\mu_{SFV,neg,i}$ are greater (lesser) than their specified limits when $\mu_{STV,avg,i}$ is positive (negative). Again, the specified limits (i.e., the specified negative spray flow variance and the specified positive spray flow variance) can be provided by the user of the analysis program 150, such as a plant operator, a control system operator, etc.

Subsequently, a block 288 evaluates whether the mean spray flow offset $\mu_{SFO,i}$ is outside of a first specified range or not, wherein the first specified range is provided by an operator of the boiler as an upper spray flow value and a lower spray flow value. Thus, in effect the block 288 evaluates whether the mean spray flow offset $\mu_{SFO,i}$ is (1) higher than the specified upper spray flow value, or (2) lower than the specified lower spray flow value. Finally, based on the evaluations performed at the blocks 282–288, a block 290 determines whether the $i^{th}$ sequence is in fact a steam temperature influencing sequence or not.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of determining a steam temperature influencing sequence for operating a plurality of soot blowers in a steam power generator, wherein the plurality of soot blowers are used to spray a cleaning spray in a heat transfer section of the steam power generator, the method comprising:
    operating the plurality of soot blowers according to a soot blowing sequence, wherein the soot blowing sequence specifies flow of the cleaning spray used by each of the plurality of soot blowers over a time sequence;
    measuring steam temperature of the heat transfer section during the time sequence;
    calculating a plurality of statistical parameters of the soot blowing sequence; and
    evaluating at least one of the plurality of statistical parameters according to a first criterion to determine whether the soot blowing sequence is the steam temperature influencing sequence.

2. A method of claim 1, wherein the first criterion includes:
    a mean positive steam temperature variance being greater than a specified positive steam temperature variance and a mean negative steam temperature variance being greater than a specified negative steam temperature variance, when a mean average steam temperature is positive; and
    the mean positive steam temperature variance being lesser than the specified positive steam temperature variance and the mean negative steam temperature variance being lesser than the specified negative steam temperature variance, when the mean average steam temperature is negative.

3. A method of claim 1, wherein the first criterion further includes at least one of the following:
    (1) a positive steam temperature variance of the soot blowing sequence being distributed approximately normally;
    (2) a negative steam temperature variance of the soot blowing sequence being distributed approximately normally;
    (3) an average steam temperature variance of the soot blowing sequence being distributed approximately normally;
    (4) a positive spray flow variance of the soot blowing sequence being distributed approximately normally;

(5) a negative spray flow variance of the soot blowing sequence being distributed approximately normally; and (6) a spray flow offset of the soot blowing sequence being distributed approximately normally.

4. A method of claim 1, wherein the first criterion further includes:

a mean spray flow positive variance and a mean spray flow negative variance are greater than specified spray flow variance limits when an average spray flow variance is positive;

the mean spray flow positive variance and the mean spray flow negative variance are lesser than the specified spray flow variance limits when the average spray flow variance is negative; and a mean spray flow offset of the soot blowing sequence being higher than a specified upper spray flow value or lower than a specified lower spray flow value.

5. A method of claim 1, wherein the cleaning spray is at least one of: (1) saturated steam; (2) superheated steam; (3) compressed air; and (4) water.

6. A method of claim 1, wherein the heat transfer section is at least one of: (1) a superheat transfer section; (2) a reheat transfer section; and (3) a water wall section.

7. A method of claim 1, further comprising determining a feed-forward signal having an absolute integral value equal to an average total amount of the cleaning spray change for the steam temperature influencing sequence.

8. A method of claim 7, wherein:

the feed-forward signal is negative if: (1) a mean spray flow average variance for the steam temperature influencing sequence is less than zero; and (2) the mean spray flow offset for the steam temperature influencing sequence is less than zero; and the feed-forward signal is positive if: (1) the mean spray flow average variance for the steam temperature influencing sequence is greater than zero; and (2) the mean spray flow offset for the steam temperature influencing sequence is greater than zero.

9. A method of claim 8, further comprising applying the feed-forward signal to a steam temperature control system of the boiler.

10. A method of claim 9, wherein the shape of the feed-forward signal is at least one of: (1) linear; (2) polynomial; (3) exponential; and (4) hyperbolic.

11. A method of claim 9, further comprising evaluating results of applying the feed-forward signal according the feed-forward signal, the evaluation including:

(1) determining the size of a negative steam temperature variance when an average steam temperature is negative; and (2) determining the size of a positive steam temperature variance when the average steam temperature is positive.

12. A system for determining a steam temperature influencing sequence for operating a plurality of soot blowers in a steam power generator, wherein the plurality of soot blowers are used to spray a cleaning spray in a heat transfer section of the steam power generator, the system comprising:

an operation module adapted to operate the plurality of soot blowers according to a soot blowing sequence, wherein the soot blowing sequence specifies flow of the cleaning spray used by each of the plurality of soot blowers over a time sequence;

a measurement module adapted to measure the steam temperature of the heat transfer section during the time sequence;

a calculation module adapted to calculate a plurality of statistical parameters of the soot blowing sequence; and an evaluation module adapted to evaluate at least one of the plurality of statistical parameters according to a first criterion to determine whether the soot blowing sequence is the steam temperature influencing sequence.

13. A system of claim 12, wherein the first criterion includes:

a mean positive steam temperature variance being greater than a specified positive steam temperature variance and a mean negative steam temperature variance being greater than a specified negative steam temperature variance, when a mean average steam temperature is positive; and the mean positive steam temperature variance being lesser than the specified positive steam temperature variance and the mean negative steam temperature variance being lesser than the specified negative steam temperature variance, when the mean average steam temperature is negative.

14. A system of claim 12, wherein the first criterion further includes at least one of the following:

(1) a positive steam temperature variance of the soot blowing sequence being distributed approximately normally;

(2) a negative steam temperature variance of the soot blowing sequence being distributed approximately normally;

(3) an average steam temperature variance of the soot blowing sequence being distributed approximately normally;

(4) a positive spray flow variance of the soot blowing sequence being distributed approximately normally;

(5) a negative spray flow variance of the soot blowing sequence being distributed approximately normally; and (6) a spray flow offset of the soot blowing sequence being distributed approximately normally.

15. A system of claim 12, wherein the first criterion further includes:

a mean spray flow positive variance and a mean spray flow negative variance are greater than specified spray flow variance limits when an average spray flow variance is positive;

the mean spray flow positive variance and the mean spray flow negative variance are lesser than the specified spray flow variance limits when the average spray flow variance is negative; and a mean spray flow offset of the soot blowing sequence being higher than a specified upper spray flow value or lower than a specified lower spray flow value.

16. A system of claim 12, further comprising a feed-forward module adapted to determine a feed-forward signal having an absolute integral value equal to an average total amount of the cleaning spray change for the steam temperature influencing sequence.

17. A system of claim 16, wherein:

the feed-forward signal is negative if: (1) a mean spray flow average variance for the steam temperature influencing sequence is less than zero; and (2) the mean spray flow offset for the steam temperature influencing sequence is less than zero; and the feed-forward signal is positive if: (1) the mean spray flow average variance for the steam temperature influencing sequence is greater than zero; and (2) the mean spray flow offset for the steam temperature influencing sequence is greater than zero.

18. A system of claim 17, further comprising a control module adapted to apply the feed-forward signal to spray valves within a steam temperature control system of the boiler.

19. A system of claim 18, further comprising a feedback module adapted to evaluate results of applying the feed-forward signal to spray valves within the steam temperature control system, the evaluation comprising:

(1) determining the size of a negative steam temperature variance when an average steam temperature variance is negative; and (2) determining the size of a positive steam temperature variance when the average steam temperature variance is positive.

20. An apparatus for determining a steam temperature influencing sequence for operating a plurality of soot blowers in a steam power generator, wherein the plurality of soot blowers are used to spray a cleaning spray in a heat transfer section of the steam power generator, the apparatus comprising:

an interface; and a controller communicatively coupled to the interface, the controller adapted to:

operate the plurality of soot blowers according to a soot blowing sequence, wherein the soot blowing sequence specifies flow of the cleaning spray used by each of the plurality of soot blowers over a time sequence;

measure steam temperature of the heat transfer section during the time sequence;

calculate a plurality of statistical parameters of the soot blowing sequence;

evaluate at least one of the plurality of statistical parameters according to a first criterion to determine whether the soot blowing sequence is the steam temperature influencing sequence;

determine a feed-forward signal having an absolute integral value equal to an average total amount of the cleaning spray change for the steam temperature influencing sequence; and apply the feed-forward signal to spray valves within a steam temperature control system of the boiler.

* * * * *

UNITED STATES PATENT AND TRADEMARK OFFICE
CERTIFICATE OF CORRECTION

PATENT NO. : 7,109,446 B1 Page 1 of 1
APPLICATION NO. : 11/057657
DATED : September 19, 2006
INVENTOR(S) : Xu Cheng et al.

It is certified that error appears in the above-identified patent and that said Letters Patent is hereby corrected as shown below:

Column 4, line 16, "one ore more" should be -- one or more --.

Signed and Sealed this

Eighteenth Day of September, 2007

JON W. DUDAS
*Director of the United States Patent and Trademark Office*